United States Patent [19]

Kitahara

[11] Patent Number: 4,845,719
[45] Date of Patent: Jul. 4, 1989

[54] ULTRASONIC LASER MODULATOR

[75] Inventor: Tadashi Kitahara, Shizuoka, Japan

[73] Assignee: Hamamatsu Photonics K.K., Shizuoka, Japan

[21] Appl. No.: 30,974

[22] Filed: Mar. 27, 1987

[30] Foreign Application Priority Data

Mar. 28, 1986 [JP] Japan ................................. 61-70341
Jan. 28, 1987 [JP] Japan ................................. 62-17757

[51] Int. Cl.$^4$ .............................................. H01S 3/10
[52] U.S. Cl. ........................................ 372/26; 372/13; 372/99; 372/100; 350/358
[58] Field of Search .................... 372/13, 26, 18, 100, 372/99, 98, 92, 16, 9; 350/358

[56] References Cited

U.S. PATENT DOCUMENTS

| | | | |
|---|---|---|---|
| 3,467,915 | 9/1969 | Uchida | 372/26 |
| 3,508,164 | 4/1970 | Uchida | 372/26 |
| 3,613,024 | 10/1971 | Geusic et al. | 372/13 |
| 3,828,276 | 8/1974 | Cohen | 372/13 |
| 3,982,203 | 9/1976 | de Wit | 372/13 |
| 4,736,378 | 4/1988 | Myslinski | 372/18 |

FOREIGN PATENT DOCUMENTS

| | | | |
|---|---|---|---|
| 0075482 | 5/1982 | Japan | 372/10 |
| 0182419 | 10/1984 | Japan | 350/358 |

Primary Examiner—William L. Sikes
Assistant Examiner—Xuan Thi Vo
Attorney, Agent, or Firm—Finnegan, Henderson, Farabow, Garrett, & Dunner

[57] ABSTRACT

An ultrasonically modulated laser comprises a laser oscillation tube including opposing ends for generating a beam of planar polarized light having a plurality of wavelengths; an output mirror at one end of the tube for reflecting the light beam; and a modulation device at the other end of the tube for simultaneously modulating a plurality of wavelengths of the light beams, including an acousto-optical prism having an incident surface for separating the beam into multiple wavelength components, a total reflection mirror for receiving and reflecting selected wavelength components impinging on the incident surface from the tube at a predetermined angle, and an ultrasonic transducer for generating standing means perpendicular to the selected wavelength components for modulating the reflected selected wavelength components.

7 Claims, 6 Drawing Sheets

ULTRASONIC LASER MODULATOR

BACKGROUND OF THE INVENTION

The present invention relates to a laser equipped with an ultrasonic modulator and, more particularly, to a laser in which some light components of various wavelengths are extracted, modulated with ultrasonics, and emitted in a direction opposite to the incident beam.

Figure 1:
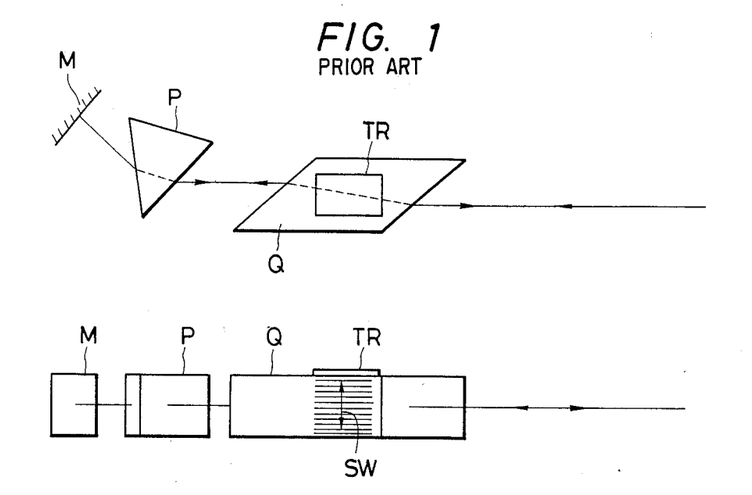
FIGS. 1 and 2 are diagrams of conventional apparatus for modulating light with ultrasonics.
Figure 2:
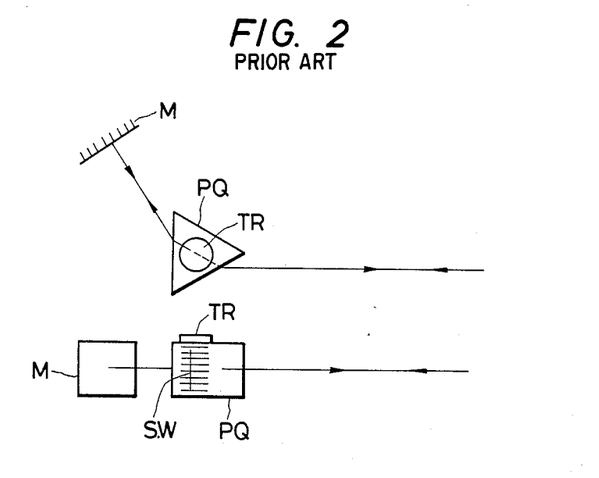

Known types of apparatus in which some light components of various wavelengths are extracted, modulated with ultrasonics, and directed in a direction opposite to the original beam are shown in FIGS. 1 and 2.

The apparatus shown in FIG. 1 comprises a prism Q made of synthetic quarts, a prism P, a mirror M that totally reflects the light coming from the prism P, and an ultrasonic transducer TR mounted on one side of the prism Q. The transducer TR produces ultrasonic standing waves perpendicularly to the path of light. When the transducer TR is not in operation, only those wavelengths of light which are transmitted through the prisms Q and P and strike the mirror M at right angles retrogress in exactly the same path as the incident path, because of the reversibility of the path of light. Therefore, it can be said that this apparatus functions as a spectrograph. When the transducer TR is operated to produce ultrasonic standing waves S.W. within the prism Q, the light is diffracted, and the magnitude of the light is modulated.

The apparatus shown in FIG. 2 can function in a manner similar to the apparatus shown in FIG. 1. However, the functions of the prisms Q and P of the apparatus shown in FIG. 1 are performed by one prism PQ as shown in FIG. 2. Those wavelengths of light which vertically impinge on the total reflection mirror M of the apparatus shown in FIG. 2 are totally reflected and follow exactly the same path as the incident path in reverse. When the ultrasonic transducer TR of the apparatus shown in FIG. 2 is operated to set up ultrasonic standing waves S.W. within the prism PQ, light is diffracted, and the magnitude of the light is modulated. These known types of apparatus can be used to analyze light and modulate its magnitude.

Figure 3:
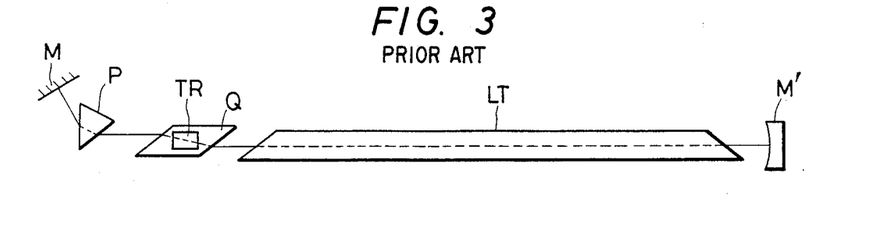
FIG. 3 is a diagram of a conventional ultrasonically modulated laser.
Figure 4:
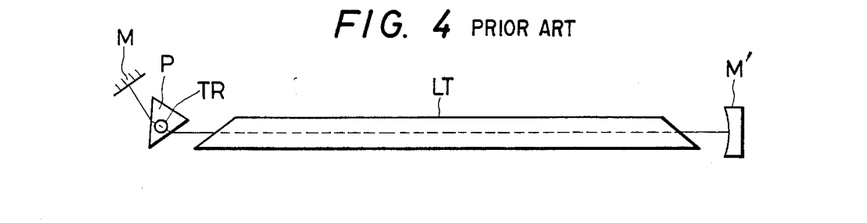
FIG. 4 is a diagram of another conventional ultrasonically modulated laser.

FIGS. 3 and 4 schematically show ultrasonically modulated lasers equipped with the apparatus shown in FIGS. 1 and 2, respectively. In each of these lasers, a laser oscillation tube LT is mounted between the apparatus shown in FIG. 1 or 2 and an output mirror M'. Many optical elements of the conventional total reflection-type spectoral modulators employed in these lasers are exposed to air. Therefore, these apparatus may have the following problems: (1) Since the surfaces of the prisms are fouled, absorption takes place; (2) The apparatus are susceptible to the effects of the disturbance of air between optical elements; (3) It is difficult to adjust the relative positions between optical elements; and (4) The path of light may be varied by mechanical vibration. Hence, the oscillation of the lasers lacks stability.

SUMMARY OF THE INVENTION

It is an object of the present invention to provide an ultrasonically modulated laser which is free of the foregoing problems and capable of producing sharp laser pulses in a stable manner.

Additional objects and advantages will be obvious from the description which follows, or may be learned by practice of the invention.

To achieve the foregoing objects and advantages, the ultrasonically modulated laser of the present invention comprises laser oscillation tube means including opposing ends for generating a beam of planar polarized light having a plurality of wavelengths;

output mirror means at one end of the tube means for relfecting the light beam; and modulation means at the other end of the tube means for simultaneously modulating a plurality of wavelengths of the light beam, including acousto-optical prism means having an incident surface for separating the beam into multiple wavelength components, total reflection mirror means for receiving and reflecting selected wavelength components impinging on the incident surface from the tube means at a predetermined angle, and ultrasonic transducer means for generating standing means perpendicular to the selected wavelength components for modulating the reflected selected wavelength components.

It is preferred that the acousto-optical prism means include a prism having a plurality of surfaces and that the total reflection mirror means include a total reflection mirror disposed on a surface of the prism for vertically receiving wavelength component impinging on the incident surface at the Brewster angle.

It is also preferred that the transducer means include an RF oscillator and a transducer mounted on another surface of the prism for generating the standing waves.

BRIEF DESCRIPTION OF THE DRAWINGS

The accompanying drawings, which are incorporated in and constitute a part of the specification, illustrate several embodiments of the invention, and, together with the description, serve to explain the principles of the invention.

Of the drawings.

DETAILED DESCRIPTION OF THE INVENTION

Reference will now be made in detail to the present preferred embodiments of the invention, examples of which are illustrated in the accompanying drawings.

Figure 5A:
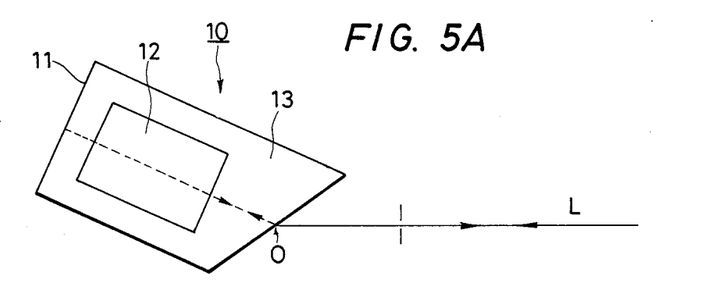
FIG. 5A is a side elevation of a total reflection-type spectral modulator according to the invention, for showing the path of light.
Figure 5B:
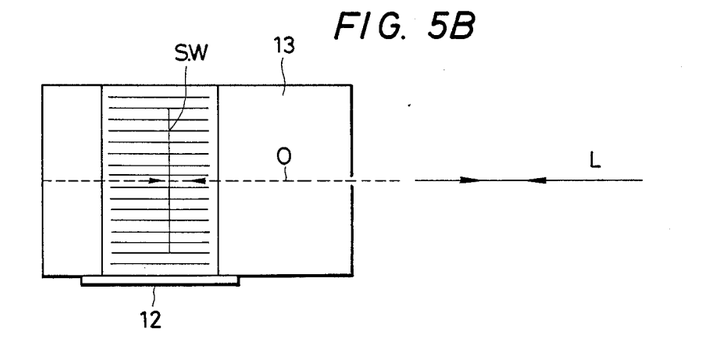
FIG. 5B is a plan view of the modulator shown in FIG. 5A, for showing the path of light.
Figure 6:
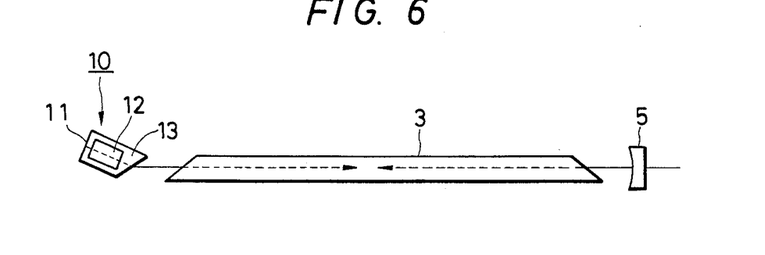
FIG. 6 is a diagram of an ultrasonically modulated laser according to the invention.

A light modulator for use in an ultrasonically modulated laser according to the invention is shown in FIGS. 5A and 5B. The modulator utilizes ultrasonic waves to modulate light. A laser making use of the modulator is schematically shown in FIG. 6. This laser has an output mirror 5, a laser tube 3 in which argon gas is contained, and a light modulator 10. The tube 3 emits plane-polarized light which is dispersed by the modulator 10 to extract only the wavelength of 5145 Å. This wavelength of light is modulated with ultrasonic waves and caused to travel back through the tube 3 along the same path as the incident path.

The modulator 10 includes a prism 13 made of synthetic quartz. The prism exhibits a refractive index of 1.461 with respect to the wavelength of 5145 Å. Therefore, the Brewster angle is 55.61°. The modulator 10 is so disposed that the light produced from the laser tube 3 strikes the incident surface of the prism 13 at an incidence angle equal to this Brewster angle. For this reason, reflection of the wavelength of 5145 Å from the surface of the prism 13 is almost negligible.

Radiation of 5145 Å enters the prism at the Brewster angle, and so it travels through the prism from a point 0 on the incident surface at a refractive angle of 34.39° (90°−55.61°). A mirror 11 is attached to the prism 13 such that its surface is perpendicular to the direction of travel of this radiation. The mirror 11 is a film which acts as a substrate consisting of many dielectric layers directly formed on the prism 13. The mirror 11 exhibits a refractive index of about 100% with respect to all the light produced from the argon laser tube 3. Therefore, light of 5145 Å is reflected vertically from the mirror 11 and travels in the opposite direction.

The laser tube 3 also produces light of other wavelengths, for example 4880 Å. This wavelength of light enters the prism at a refractive index of $\sin^{-1}\{(\sin 55.61°)/1.464\} = 34.31$, and impinges on the mirror 11 at an incidence angle of 0.08°. Thus, it is not a vertical incidence. Therefore, the reflected beam does not follow the same path as the incident beam.

An ultrasonic transducer 12 is attached to the prism 13 and excited with RF waves produced by an RF generator (not shown) to generate ultrasonic standing waves in the directions indicated by the arrows S.W in FIG. 5B. Since the standing waves diffract some of the light of 5145 Å, the intensity of the reflected light is weakened accordingly. The intensity of the ultrasonic standing waves varies at a frequency twice the frequency of the RF waves applied to the transducer 12. The intensity of the light reflected from the modulator 10 is modulated with the same frequency.

The output mirror 5 of the laser shown in FIG. 6 exhibits a transmissivity of 5 to 6% in the wavelength range of 4200 to 5200 Å. Therefore, most of the light sent to the output mirror 5 from the laser tube 3 is reflected. The modulator 10 is so disposed that light of 5145 Å which travels along the axis of the argon laser tube 3 after reflection by the output mirror 5 hits the total reflection mirror 11 vertically. Consequently, when the transducer 12 is not excited, all of the light of 5145 Å leaves the laser. That is, the laser oscillates at this wavelengths. However, other wavelength of light are reflected in different directions. Hence, the reflected beam does not follow the same path as the incident beam, and is unable to travel back and forth between the output mirror 5 and the total reflection mirror 11 of the modulator 10. As a result, the laser can oscillate only at wavelength 5145 Å.

It is possible to use the light modulator 10 as a light shutter by changing the intensity of the ultrasonic standing waves in synchronism with the time taken for light to reciprocate between the output mirror 5 and the total reflection mirror 11 of the modulator 10. The pulse duration of the laser obtained by applying an RF power of about 0.5 W was approximately 75 ps, which is shorter than the conventional duration of 90 ps. It was also found that the peak intensity of the laser beam increased by 30% as compared with the peak intensity obtained heretofore. The amount of ripples contained was 3% rms, which is less than the conventionally derived amount of 10% rms. The laser shown in FIG. 6 can oscillate at other wavelengths, for example 4880 Å.

Referring to FIG. 5A, the light modulator 10 is rotated through about 0.1° by a rotating device (not shown) about an axis which passes through the point 0 and is vertical to the plane of the drawing. Thus, the laser oscillates at wavelength 4880 Å. Ultrasonic waves are applied in the same way as the foregoing. As a result, similar laser pulses are obtained. The laser can similarly oscillate at other wavelengths.

In the conventional apparatus shown in FIG. 2, the total reflection mirror M is located remotely from the ultrasonic modulator TR. The laser beam which enters the modulator TR from the side opposite to the mirror M passes through the modulator and is reflected by the mirror M, after which it reenters the modulator. Since it is diffracted twice, the laser beam component which travels in the same direction as the non-diffracted light exists. This laser beam lags the non-diffracted light by a phase angle $\Delta\Phi \equiv (2\pi/\lambda)\cdot 2D\{(\cos\theta)^{-1}-1\} = (2(2\pi/\lambda)\cdot D\theta^2 = (2\pi D/\Lambda^2)\cdot\lambda$ where $\theta = \lambda/\Lambda$, $\lambda$ is the wavelength of the light, $\Lambda$ is the wavelength of the ultrasonic waves, and D is the distance between the mirror and the modulator. For this reason the effects of the interference between the diffracted light and non-diffracted light are of importance. The modulation is a maximum only when the phase difference is an integral multiple of $2\pi$ (J. Kluge's Doctoral Thesis, Feb. 23, 1984). The description made herein is concerned with the diffracted components of the first order. It is known that the above considerations are also important for diffracted components of higher orders, as indicated by the aforementioned J. Kluge's thesis. Since $\Delta\Phi$ depends on the wavelength of light, the distance D which makes the modulation a maximum depends on the wavelength $\lambda$ of light, except when D=0. That is, in order to achieve intensive modulation, the valve of D is required to assume a different value for each individual wavelength, except when D=0.

In the present invention, the requirement D=0 is satisfied. This permits laser beams of wavelength 4200 to 5200 Å to be modulated strongly. Consequently, the laser beam can be modulated strongly over the whole wavelength range of 4200 to 5200 Å. As a result, short pulses can be produced from the laser beam.

Figure 7:
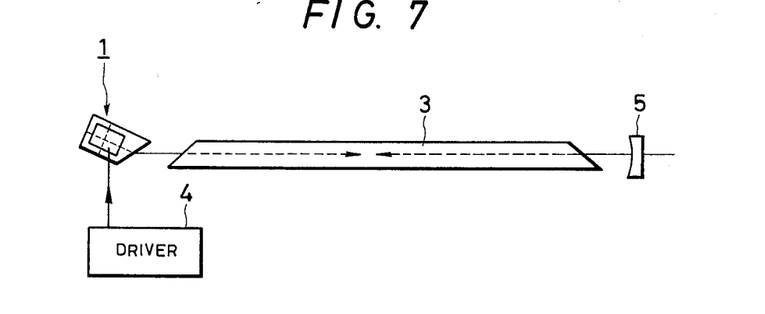
FIG. 7 is a diagram of another ultrasonically modulated laser according to the invention.

Referring next to FIG. 7, there is shown another ultrasonically modulated laser according to the invention. This laser has a total reflection spectral modulator 1, an argon laser tube 3, and an output mirror 5 which are arranged as shown. This laser is essentially similar in arrangement to the laser already described. In this example, the argon laser tube 3 produces plane-polarized light which is dispersed to allow only the wavelength of 5145 Å of light to follow the same path as the incident beam. The extracted light is modulated with ultrasonic waves.

Figure 8:
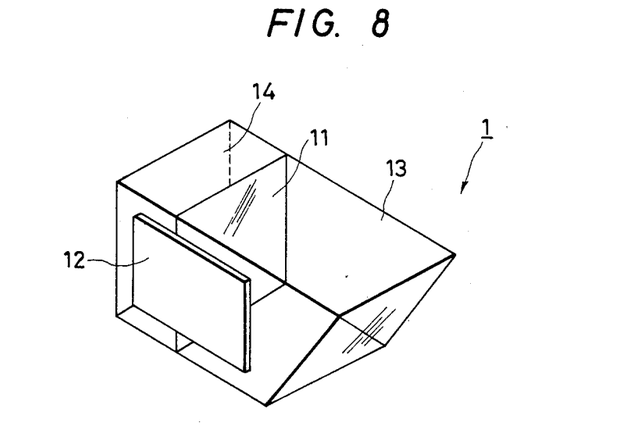
FIG. 8 is a perspective view of another total reflection-type spectral modulator for use in an ultrasonically modulated laser according to the invention.
Figure 9A:
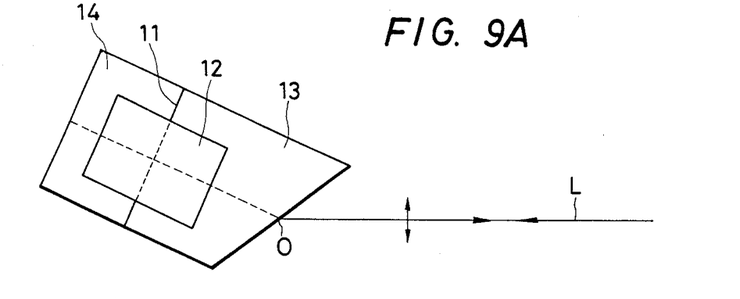
FIG. 9A is a side elevation of the modulator shown in FIG. 8, for showing the path of light.
Figure 9B:
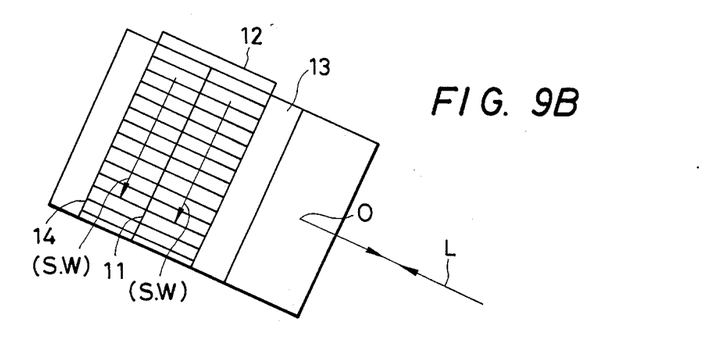
FIG. 9B is a bottom view of the modulator shown in FIG. 8, for showing the path of light.

FIG. 8 shows a total reflection-type spectral modulator for use in the laser shown in FIG. 7. The relation between this spectral modulator and the incident light is shown in FIGS. 9A and 9B.

The modulator 1 has a prism 13 made of synthetic quartz. The refractive index exhibited by the prism with respect to wavelength 5145 Å is 1.461. Hence, the Brewster angle is 55.61°. A mirror 11 is attached to the prism 13 in such a way that its surface is vertical to the direction of propagation of the light. The mirror 11 is a film that serves as a substrate, and consists of many dielectric layers directly formed on the prism 13. The reflectivity of the mirror 11 is about 100% with respect to the light produced from the argon laser tube 3 and having a wavelength range of 4200 to 5200 Å. A slab of acoustic continuum 14 is made of silica glass and is bonded to the mirror 11 with epoxy resin adhesive. Two opposite surfaces of the slab 14 are parallel to each other and also to the path of the light beam in the same manner as the prism 13. An ultrasonic transducer 12 is attached to one of these parallel surfaces and extends over both the prism 13 and the slab 14. The transducer 12 is excited with the RF power produced by an ultrasonic transducer drive circuit 4 shown in FIG. 7, the driver circuit 4 comprises an RF generator. As shown in FIG. 9B, the transducer 12 produces ultrasonic standing waves S.W. Some of the light of wavelength 5145 Å is diffracted because of the standing waves produced in the prism 13 and, therefore, the reflected light is weakened accordingly. When viewed from the side of the prism 13, ultrasonic standing waves exist continuously on both sides of the mirror 11 from which light is reflected. Therefore, when light reciprocates once between the output mirror 5 (FIG. 7) and the mirror 11, it is diffracted precisely once.

The output mirror 5 of the laser shown in FIG. 7 exhibits a transmissivity of 5 to 6% in the wavelength range of 4200 to 5200 Å. Accordingly, most of the light sent from the laser tube 3 to the output mirror 5 is reflected. This reflected light of 5145 Å travels along the axis of the laser tube 3 and enters the spectral modulator 1 at the Brewster angle from a point 0 lying on the incident surface. The refractive angle is 90°−55.61°=34.39°. When the transducer 12 is not excited, all the light of 5145 Å comes out of the laser, i.e., the laser oscillates at this wavelength.

Since the light of 4880 Å is reflected in a different direction, the reflected beam does not follow the same path as the incident beam. As this light cannot travel back and forth between the output mirror 5 and the mirror 11 of the modulator 1, the laser oscillates only at wavelength 5145 Å. The modulator 1 can be made to act as a light shutter by varying the intensity of the ultrasonic standing waves in synchronism with the time taken for light to reciprocate between the output mirror 5 and the mirror 11 of the modulator 1.

Figure 10:
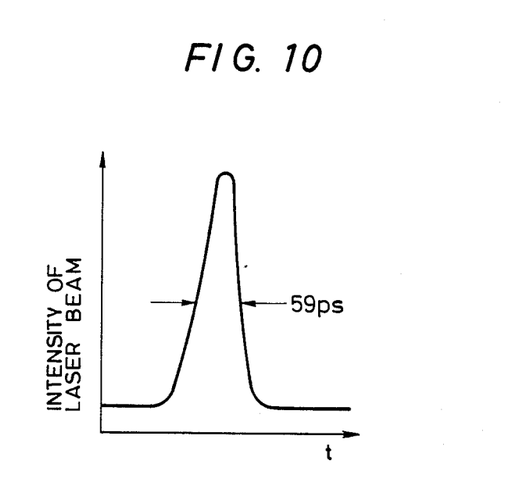
FIG. 10 is a wave form diagram for illustrating the operation of the laser shown in FIG. 7.

The graph of FIG. 10 shows one pulse contained in the laser pulse train obtained by applying RF power of about 0.5 W to the transducer 12. The frequency of the pulse train was 130 MHz, and the pulse duration was 59 ps. The pulse duration obtained by an apparatus using the conventional total reflection-type spectral modulator 10 shown in FIG. 5 was 70 ps. Thus, the peak intensity of the laser beam increased by 15% as compared with the peak intensity obtained heretofore. The amount of ripples contained was 2% rms, which is less than the 3% rms produced heretofore.

The laser shown in FIG. 7 can also oscillate at other wavelengths, for example 4880 Å. The modulator 1 is rotated by a rotating device (not shown) through approximately 0.1° about an axis which passes through the point 0 and is vertical to the plane of the drawing to emit light of 4880 Å. Ultrasonic waves are applied in the same way as in the aforementioned examples to produce similar laser pulses. Other wavelengths of light can also be produced similarly. It is considered that the existence of undisturbed ultrasonic standing waves along the reflective surface permits such a good generation of pulses.

Figure 11A:
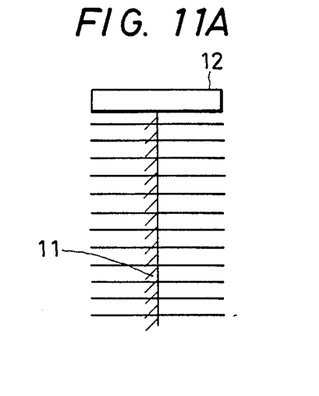
FIGS. 11A and 11B show the manner in which light is diffracted in the modulator shown in FIGS. 9A and 9B.
Figure 11B:
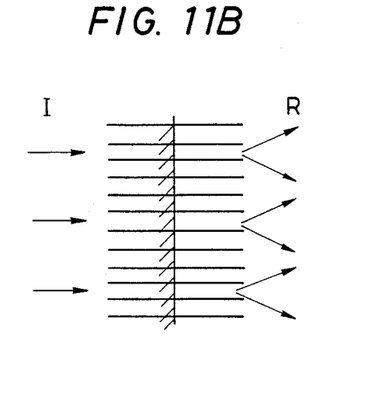

In this example, as shown in FIG. 11A, ultrasonic standing waves are formed continuously on both sides of the total reflection mirror 11. Therefore, it can be said that one type of ultrasonic standing waves exists, as shown in FIG. 11B. The incident light I is diffracted only once in this medium and dispersed as indicated by the arrows R. Consequently, in the structure shown in FIGS. 9A and 9B, the total reflection-type light modulator 1 can be made to act as an improved light shutter. Hence, it is possible to obtain sharp light pulses.

Figure 12A:
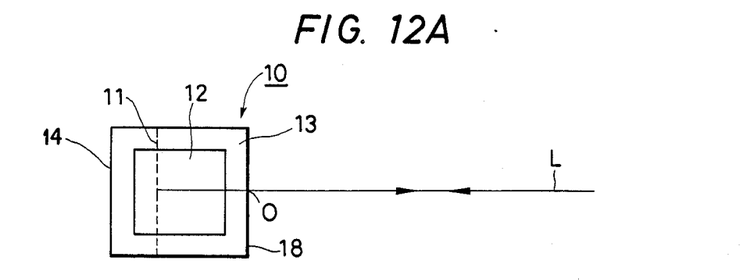
FIG. 12A is a side elevation of a total reflection-type light modulator for use in a mode-locked laser according to the invention, for showing the relation between incident light and the modulator.
Figure 12B:
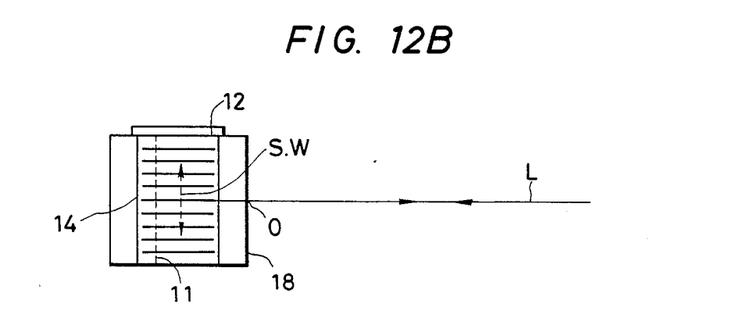
FIG. 12B is a bottom view of the modulator shown in FIG. 12A, for showing the relation between incident light and the modulator.
Figure 13:
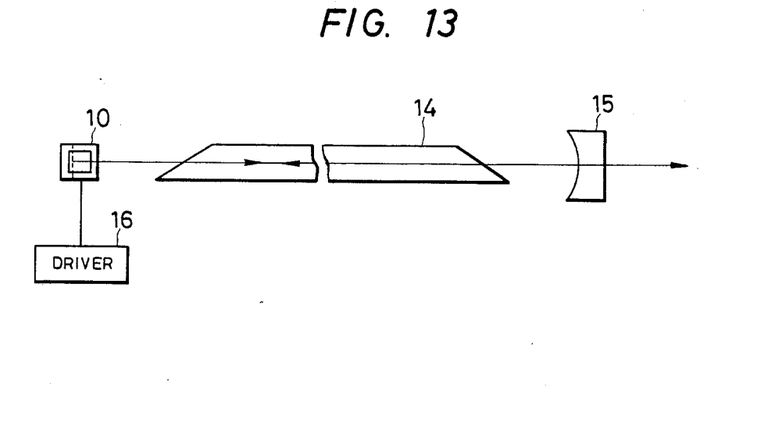
FIG. 13 is a block diagram of a laser according to the invention.

Referring next to FIGS. 12A and 12B, there is shown a total reflection-type light modulator for use in a mode-locked laser according to the invention. One example of this mode-locked laser is shown in FIG. 13. It is to be noted that like components are indicated by like reference numerals throughout all the figures. Indicated by numeral 18 is a reflectionless film. In this example, an argon laser tube is used. Of the light produced from the argon laser tube, all the light ranging from 4200 to 5200 Å is caused to emanate from the laser, and is modulated in intensity with ultrasonic waves.

More specifically, a slab of an acousto-optical medium 13 is made of silica glass. The reflectionless film 18 is attached to the medium 13 such that its surface is perpendicular to the direction of travel of the incident laser beam. A total reflection mirror 11 formed by a film consisting of many dielectric layers is also mounted on the medium 13. The film 18 and the mirror 11 exhibit reflectivities of 0% and 100%, respectively, with respect to light of wavelengths ranging from 4200 to 5200 Å. A plate of an acoustical continuum 14 made of silica glass is attached to the mirror 11 via a layer of indium of about 1 micron thick. The continuum 14 has two opposite surfaces which are parallel to each other and to the path of light beam, similar to the medium 13. An ultrasonic transducer 12 is attached to one of these two parallel surfaces and extends over both the medium 13 and the continuum 14. The transducer 12 is excited with an RF drive signal produced from a driving portion 16 to produce ultrasonic waves, which set up standing waves S.W. within the acousto-optical medium. As mentioned previously, some of the incident light is diffracted accordingly. Since the ultrasonic standing waves continuously exist on both sides of the total reflection mirror 11, as described above, when light reciprocates between the output mirror 15 and the total reflection mirror 11 of the modulator 10, it is diffracted precisely once. Thus, a loss in the light takes place.

The output mirror 15 of the laser shown in FIG. 13 exhibits a transmissivity of 5 to 6% in the wavelength range of 4200 to 5200 Å. Therefore, most of the light incident on the output mirror 15 is reflected, travels along the axis of the laser tube 14, and enters the light modulator 10. When the transducer 12 is not excited, all of the light of wavelength 5145 Å is emitted from the laser. The total reflection-type modulator 10 can be caused to act as a light shutter by changing the intensity of ultrasonic standing waves in synchronism with time taken for light to reciprocate between the output mirror 15 and the total reflection mirror 11 of the modulator 10, as described already.

Figure 14:
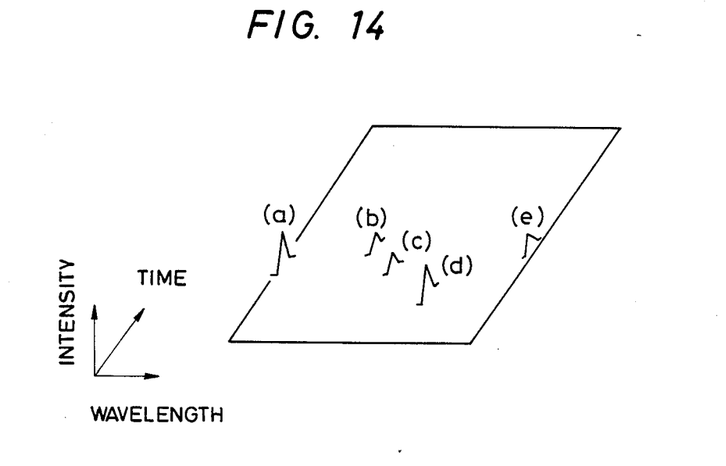
FIG. 14 is a waveform diagram of short pulses produced by the laser shown in FIG. 13.

FIG. 14 shows one pulse train contained in laser pulse trains obtained by applying RF power of about 0.5 W to the ultrasonic transducer 12. The pulse trains have different wavelengths and a frequency of 130 MHz.

Table 1 shows the wavelength of the pulses obtained by analyzing FIG. 14, the half-value widths of the pulses, the pulse energies, and the time lags.

TABLE 1

|  | a | b | c | d | e |
|---|---|---|---|---|---|
| wavelength, Å | 5145 | 5017 | 4965 | 4880 | 4765 |
| half-value width, ps | 96.9 | 104.1 | 96.2 | 72.7 | 87.7 |
| pulse energy, mW | 514 | 138 | 256 | 364 | 227 |
| time lag, ps | 390 | 620 | 320 | 0 | 650 |

Each pulse energy value is obtained by integrating the time change in the intensity of one pulse with respect to time. The time lag is measured against the initially appearing pulse (d) of one group of pulses. Laser rays of different wavelengths can be shaped into short pulses in this way for the following reason. The laser rays are continuously diffracted and attenuated by ultrasonic waves before and after they are reflected from the total reflection mirror. Hence, any desired laser light ranging from 4200 to 5200 Å can be strongly modulated.

As described above, the mode-locked laser shown in FIG. 13, oscillates at several different wavelengths. The ultrasonic transducer extending over both the acousto-optical medium and the acoustic continuum is excited to produce ultrasonic standing waves whose wave fronts are continuous on both sides of the total reflection mirror. Thus, light entering through the reflectionless film on the acousto-optical medium is reflected by the total reflection mirror and diffracted only once at the location where the ultrasonic standing waves exist. Desired wavelengths of light are selectively allowed to pass by the improved optical shutter action. In this way, several modes of oscillation are synchronized, and it is possible to produce short pulses from any desired wavelength of light.

As described thus far, the novel ultrasonically modulated laser incorporates an acousto-optical prism, a total reflection mirror, and an ultrasonic transducer. Therefore, the laser can be made small and lightweight. When the laser is used, it is not necessary at all to adjust the relative positions between the components. When the laser is in use, even if it is subjected to mechanical vibrations, the positional relations between the components is maintained constant. The laser can oscillate at a selected specific wavelength. Also, a slab of an acousto-optical medium and an ultrasonic transducer are provided. The medium is connected with the prism via the total reflection mirror. The transducer is mounted on the surfaces of the prism and the medium which are vertical to the incident surface of the prism, and extends over the total reflection mirror. The transducer is excited to produce acoustical standing waves without disturbance on both sides of the total reflection mirror. Consequently, sharp pulse trains can be stably generated.

Various modifications and variations should be made in the invention without departing from the scope or spirit of the invention.

What is claimed is:

1. An ultrasonic laser modulator for modulating a laser beam generated by a laser having a laser oscillation tube with a first and a second end and an output mirror at the first end, said modulator comprising:
   an acousto-optical prism having an incident surface positioned substantially adjacent to the second end of the laser oscillation tube to receive and propagate the laser beam within said prism along an optical path, a second surface opposite said incident surface, and a third surface substantially perpendicular to said incident and said second surfaces of said prism and substantially parallel to the optical path;
   a total reflection mirror disposed on said second surface of said prism;
   an acoustic medium disposed on said total reflection mirror to sandwich said total reflection mirror between said prism and said acoustic medium, said acoustic medium having a wall substantially continuous with said third surface of said prism; and
   an ultrasonic transducer disposed on said third surface of said prism and said wall of said acoustic medium for selectively producing an acoustic standing wave in said prism, in said total reflection mirror and in said acoustic medium substantially perpendicularly to the optical path and having wave fronts that are substantially continuous on opposite sides of said total reflection mirror.

2. The ultrasonic laser modulator of claim 1, wherein said total reflection mirror is substantially perpendicular to the optical path to selectively reflect a predetermined wavelength component of the laser beam incident upon said total reflection mirror along the optical path.

3. The ultrasonic laser modulator of claim 1, wherein said prism and said acoustic medium include silica glass.

4. The ultrasonic laser modulator of claim 1, wherein said total reflection mirror includes a film having plural dielectric layers.

5. An ultrasonic laser modulator for modulating a laser beam generated by a laser having a laser oscillation tube with a first end and a second end and an output mirror at the first end, said modulator comprising: an acousto-optical medium having an incident surface positioned substantially adjacent to the second end of the laser oscillation tube to receive and propagate the laser beam within said acousto-optical medium along an optical path, a second surface opposite said incident surface, and a third surface substantially perpendicular to said incident and said second surfaces of said acousto-optical medium and substantially parallel to the optical path;
   a total reflection mirror disposed on said second surface of said acousto-optical medium;
   an acoustic medium disposed on said total reflection mirror to sandwich said total reflection mirror between said acousto-optical medium and said acoustic medium, said acoustic medium having a wall substantially continuous with said third surface of said acousto-optical medium;

an ultrasonic transducer disposed on said third surface of said acousto-optical medium and said wall of said acoustic medium for selectively producing an acoustic standing wave in said acousto-optical medium, in said total reflection mirror and in said acoustic medium substantially perpendicularly to the optical path and having wave fronts that are substantially continuous on opposite sides of said total reflection mirror.

6. The ultrasonic laser modulator of claim 5, wherein the acousto-optical medium includes silica glass.

7. The ultrasonic laser modulator of claim 5, wherein said total reflection mirror includes a film having plural dielectric layers.

* * * * *